(12) United States Patent
Löf et al.

(10) Patent No.: US 7,544,023 B2
(45) Date of Patent: Jun. 9, 2009

(54) CUTTING INSERT FOR TURNING

(75) Inventors: Ronnie Löf, Sanviken (SE); Chris Mills, Sandviken (SE); Hans Thordenberg, Gävle (SE); Jörgen Wiman, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 427 days.

(21) Appl. No.: 10/841,574

(22) Filed: May 10, 2004

(65) Prior Publication Data
US 2005/0249559 A1 Nov. 10, 2005

(30) Foreign Application Priority Data
May 8, 2003 (SE) .................... 0301323

(51) Int. Cl.
*B23B 27/16* (2006.01)
*B23C 5/10* (2006.01)

(52) U.S. Cl. ...................... 407/113; 407/115

(58) Field of Classification Search .......... 407/113, 407/115, 114, 116, 48, 40, 53, 103, 33, 34, 407/64
See application file for complete search history.

(56) References Cited

U.S. PATENT DOCUMENTS

| | | | |
|---|---|---|---|
| 3,466,720 A | 9/1969 | Stier | |
| 5,011,340 A * | 4/1991 | Pettersson et al. | 407/114 |
| 5,116,167 A * | 5/1992 | Niebauer | 407/114 |
| 5,503,509 A | 4/1996 | von Haas et al. | |
| 5,634,745 A | 6/1997 | Wiman et al. | |
| 5,890,853 A * | 4/1999 | Hiranaka | 408/224 |
| 5,951,215 A | 9/1999 | Paya et al. | |
| 6,540,447 B2 * | 4/2003 | Nagata et al. | 407/35 |
| 6,543,970 B1 * | 4/2003 | Qvarth et al. | 407/114 |
| 6,669,412 B1 * | 12/2003 | Hirose et al. | 407/113 |
| 6,957,935 B2 * | 10/2005 | Sung et al. | 407/113 |
| 7,121,772 B2 * | 10/2006 | Krahula et al. | 407/113 |
| 7,390,148 B2 * | 6/2008 | Krenzer et al. | 407/30 |

FOREIGN PATENT DOCUMENTS

| | | |
|---|---|---|
| DE | 9400327 | 3/1994 |
| EP | 0 029 764 | 10/1983 |
| EP | 1157768 B1 | 8/2005 |
| GB | 951624 | 3/1964 |
| JP | 11-309608 | 11/1999 |
| JP | 2001-315003 | 11/2001 |

* cited by examiner

Primary Examiner—Willmon Fridie
(74) Attorney, Agent, or Firm—Drinker Biddle & Reath LLP

(57) ABSTRACT

A turning insert includes at least one cutting surface having at least one corner area. The corner area defines a nose angle in the range of 30-85°. The corner area includes a beveled edge. A bisector of the nose angle intersects the beveled edge at a center thereof at a right angle.

13 Claims, 4 Drawing Sheets

CUTTING INSERT FOR TURNING

This application claims priority under 35 U.S.C. § 119 to Patent Application Serial No. 0301323-2 filed in Sweden on May 8, 2003, the entire content of which is hereby incorporated by reference.

TECHNICAL FIELD OF THE INVENTION

The present invention relates to a cutting insert for turning, the cutting insert comprising at least one cutting geometry surface having at least one corner area, wherein a nose angle of the corner area is in the interval of $30°<\alpha<85°$. The material in the cutting insert may comprise different hard materials that cutting inserts for chip removing machining normally are manufactured from, such as for example cemented carbide, ceramics, cubic boron nitride and diamond.

PRIOR ART

So-called abrasive jet wear of the major cutting edge on cutting inserts used for turning operations is a problem that prior art has sought to solve in a number of different ways. Generally, at a smaller setting angle, a smaller degree of abrasive jet wear is obtained.

According to one variant, square cutting inserts are used, the setting angle being determined at 45°.

According to another variant, round cutting inserts are used, the cutting depth in such a case normally being limited to approx. 25% of the diameter of the cutting insert.

According to an additional variant, cutting inserts having a relatively large corner radius are used, the cutting depth in such a case being limited to approx. 30% of the corner radius. This is suitable in finishing operations but for roughing operations, a larger cutting depth is generally required.

OBJECTS AND FEATURES OF THE INVENTION

A primary object of the present invention is to provide a turning insert which in chip removing machining exhibits a reduced abrasive jet wear of the cutting corner, in comparison with known cutting inserts.

Another object of the present invention is to reduce the quantity of material that will be left in the fillet after finalized machining.

Yet an object of the present invention is that machining by means of the cutting insert should be able to be effected in two directions perpendicular to each other with one and the same cutting edge.

At least the primary object of the present invention is realised by means of a cutting insert for turning operations, the turning insert comprising at least one cutting surface which has at least one corner area. The corner area defines a nose angle in the range of 30-85°. The corner area includes a beveled edge, wherein a bisector of the nose angle intersects a midpoint of the beveled edge at a right angle.

BRIEF DESCRIPTION OF THE DRAWINGS

Below, preferred embodiments of the cutting insert according to the present invention will be described, reference being made to the accompanying drawings, where.

DETAILED DESCRIPTION OF PREFERRED EMBODIMENTS OF THE INVENTION

Figure 1:
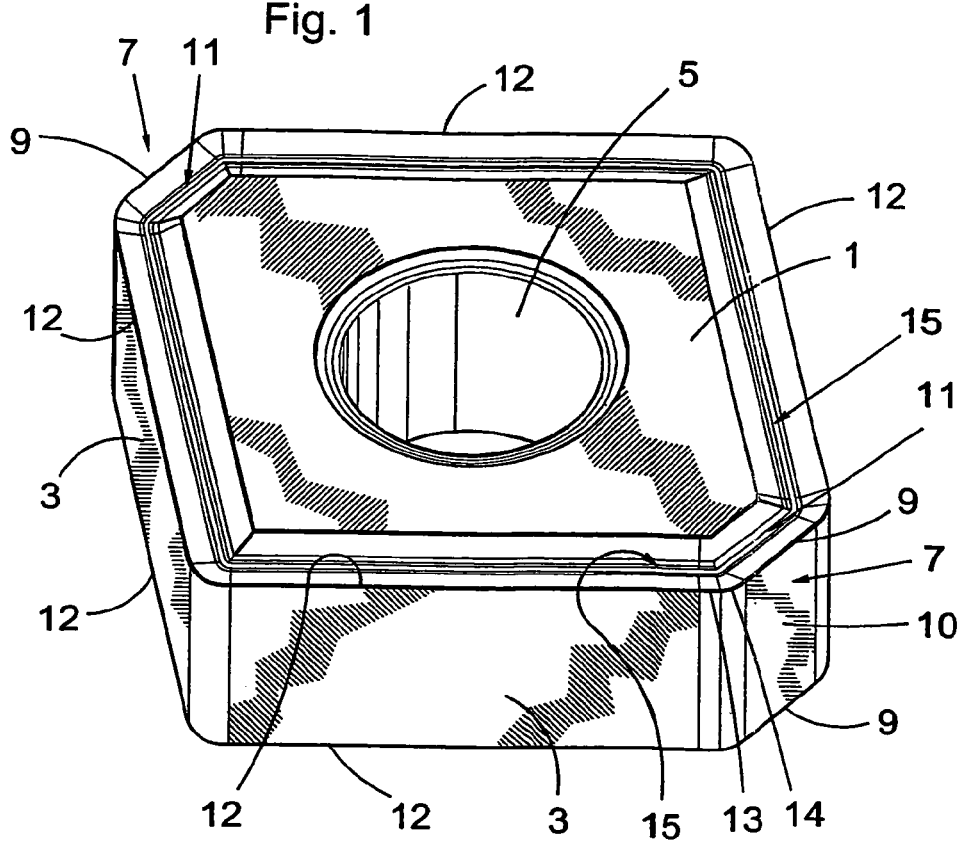
FIG. 1 shows a perspective view of an embodiment of a cutting insert according to the present invention.

The cutting insert according to the present invention FIG. 1 is generally negative. The cutting insert according to FIG. 1 comprises two cutting surfaces 1, i.e., the top and bottom surfaces of the insert, which are parallel to each other and located at a certain distance from each other. In FIG. 1, only one of the cutting surfaces 1 is seen. The cutting surfaces 1 are inter-connected by means of four side surfaces 3, which, since the cutting insert is negative, generally have an extension perpendicular to the cutting geometry surfaces 1. Only two side surfaces 3 are visible in FIG. 1.

Furthermore, the cutting insert shown in FIG. 1 has a center hole 5, which is intended to receive a screw or the like in order to anchor the cutting insert in a cutting seat of a holder (not shown).

Below, the parts of the cutting insert located in connection with the cutting geometry surface 1 shown in FIG. 1 will be described, wherein it should be pointed out that the cutting surface not visible in FIG. 1 is identically formed to the one which is visible. Adjacent to the cutting surface 1 of the turning insert according to the present invention shown in FIG. 1, two diametrically located corner areas 7 are arranged, which constitute the basis of the present invention. Each corner area 7 comprises, in the embodiment illustrated, a rectilinear edge bevel 9, or beveled edge, which normally constitutes a major cutting edge in use of the cutting insert according to FIG. 1. Adjacent to the edge bevel 9, the cutting insert according to FIG. 1 has a clearance surface 10, which generally has an extension between the two identical edge bevels 9. Inside each rectilinear edge bevel 9, a chip breaker 11 is arranged, which is not described more in detail since it can have different designs within the scope of the present invention.

Each side surface 3 includes two longitudinal side edges 12, which are mutually parallel and connect at one end thereof to an adjacent edge bevel 9. In the embodiment shown in FIG. 1, said connection takes place via so-called wiper technology, i.e. there are provided radiused wiper edge segments 13 and 14 which define a transition between the edge bevel 9 and the edge 12 and which have different respective radii of curvature. The side edges 12 constitute main cutting edges in this embodiment.

As is seen in FIG. 1, the portions 15 located inside the edges 12 have in principle the same design as the chip breaker 11. However, said portions 15 do normally not exert any chip breaking function.

Figure 2:
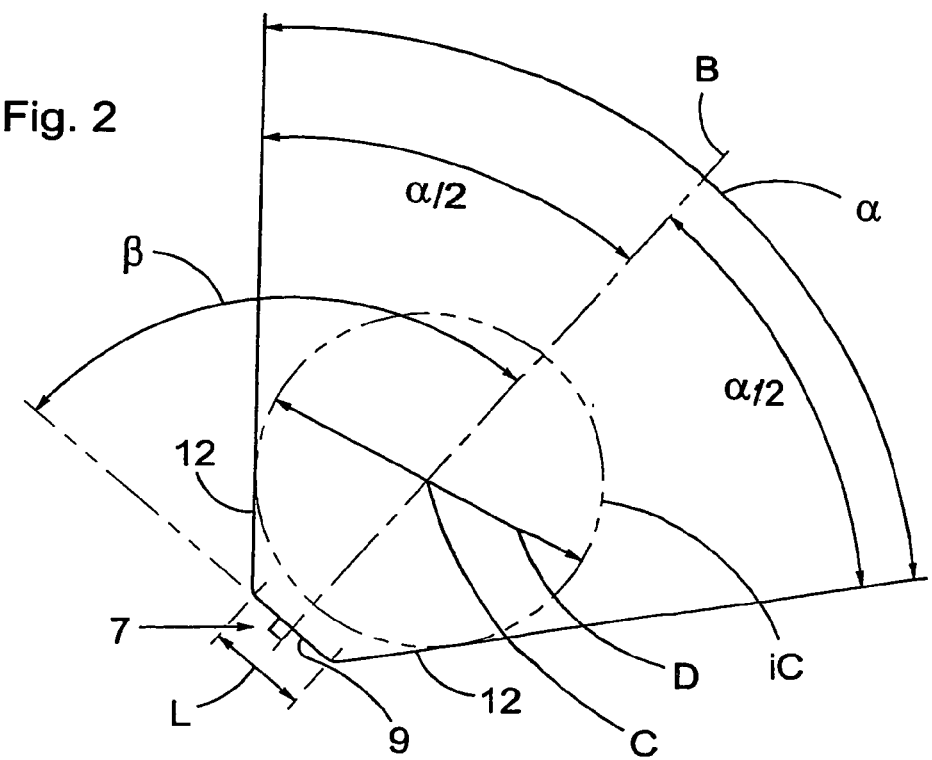
FIG. 2 shows a schematic planar view of a corner of the cutting insert according to FIG. 1.

In FIG. 2, a schematic planar view is shown of a corner area 7 of the cutting insert according to FIG. 1. In this schematic planar view according to FIG. 2, the nose angle α of the corner area 7, i.e. the angle between the edges 12, is by means of a bisector B divided into two equally large angles α/2. In the cutting insert according to FIGS. 1 and 2, α=80°.

The bisector B intersects the edge bevel 9 in the center thereof, i.e. the parts of the edge bevel 9 located on both sides of the bisector B are equally long. The bisector B intersects the edge bevel 9 at a right angle, which in FIG. 2 is defined by the fact that the angle β, between the bisector B and an extension of the edge bevel 9, has a value of 90°. The length of the edge bevel 9 has been designated by L.

In FIG. 2, also an imaginary inscribed circle iC is drawn by means of a dashed circular line, the inscribed circle being tangent to the two main cutting edges 12 disposed on opposite sides of the corner region. The center C of the inscribed circle iC coincides with the centre for the center hole 5 in FIG. 1., and is disposed midway between the opposite corner areas 7, and thus touches all four of the side edges 12.

By studying FIG. 2, it is realized that the cutting insert for turning according to the present invention shown in FIG. 1 is symmetrical with respect to the bisector B.

Figure 3:
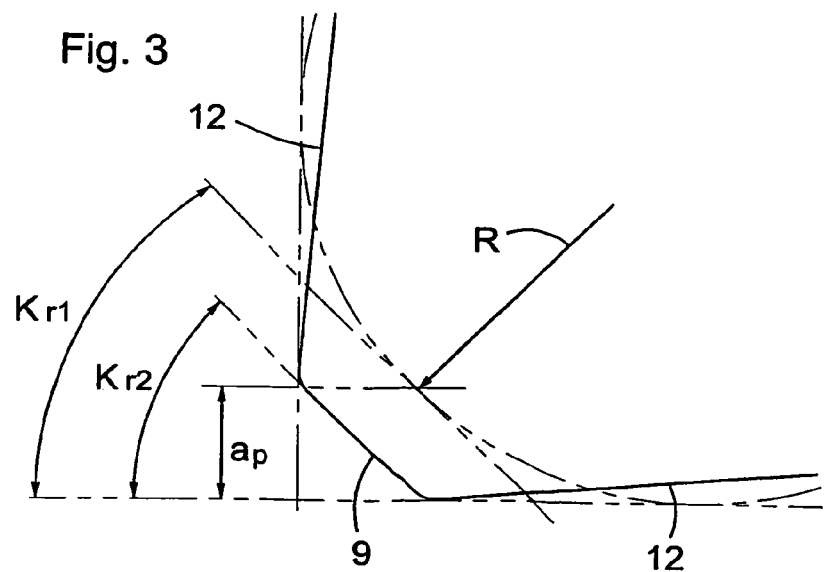
FIG. 3 shows a comparison between an active corner of a cutting insert according to the present invention and an active corner of a cutting insert according to prior art.

In FIG. 3, a comparison is illustrated in turning by means of the cutting insert according to FIG. 1 and a conventional cutting insert having a corner radius R. The cutting depth $a_p$ in question is equal for the two cutting inserts, which as has been pointed out by way of introduction means that the cutting depth $a_p$ is approx. 0.3×R if a setting angle $K_{r1}$ of 45° is to be obtained for the conventional cutting insert. As is seen in FIG. 3, the corresponding cutting depth $a_p$ is obtained for the cutting insert according to FIG. 1, the setting angle $K_{r2}$ also in this case being 45°. By studying FIG. 3, it is realized that the cutting insert for turning according to the present invention leaves substantially less material in the fillet than a conventional cutting insert. It will also be appreciated by studying FIGS. 2 and 3 that the cutting insert according to FIG. 1 can be used for turning in two directions perpendicular to each other without the location of the cutting insert in the holder having to be changed.

Figure 4:
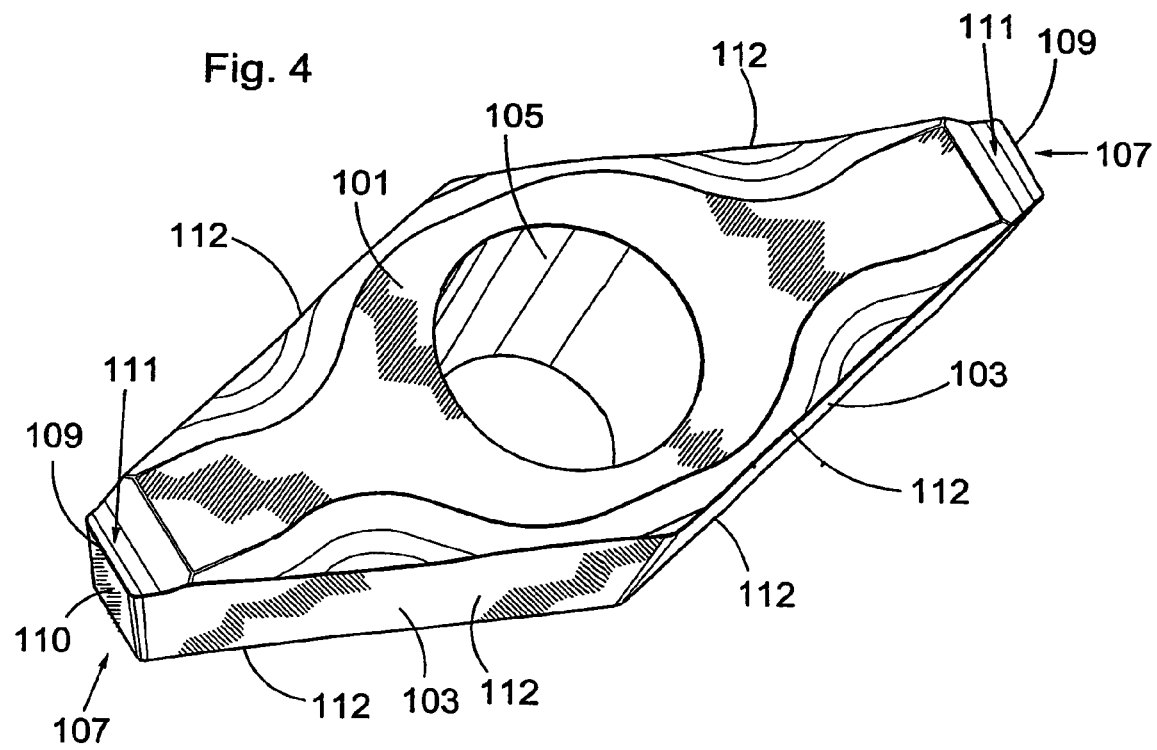
FIG. 4 shows an alternative embodiment of a cutting insert according to the present invention.

In FIG. 4, an alternative embodiment is shown of a cutting insert for turning according to the present invention. The cutting insert shown in FIG. 4 is intended for copying and has generally a positive geometry. Thus, the cutting insert according to FIG. 4 has a top cutting surface 101 as well as a bottom support surface (not visible), the cutting surface 101 and the support surface being parallel to each other and located at a certain distance from each other. The cutting surface 101 and the support surface are inter-connected by means of four side surfaces 103. Since the cutting insert is positive, the side surfaces 103 connect to the cutting geometry surface 101 under an acute angle while the side surfaces 103 connect to the support surface under an obtuse angle. Only two side surfaces 103 are visible in FIG. 4.

Furthermore, the cutting insert shown in FIG. 4 has a center hole 105, which is intended to receive a screw or the like in order to anchor the cutting insert in a cutting seat of a holder (not shown).

Below, the corner areas 107 located in connection with the cutting geometry surface 101 of the cutting insert shown in FIG. 4 will be described. The two diametrically arranged corner areas 107 constitute, as has been pointed out above, the basis of the present invention. Each corner area 107 comprises a rectilinear edge bevel 109 in the embodiment illustrated, which normally constitutes major cutting edge in use of the cutting insert according to FIG. 4. Adjacent to the edge bevel 109, the cutting insert according to FIG. 1 has a clearance surface 110. Inside each rectilinear edge bevel 109, a chip breaker 111 is arranged, which is not described more in detail since it can have different designs within the scope of the present invention.

Each side surface 103 includes two longitudinal side edges 112, which are mutually parallel and connect at one end thereof to an adjacent edge bevel 109. In the embodiment shown in FIG. 4, said connection takes place via so-called wiper technology, correspondingly as has been described above in connection with FIG. 1.

Figure 5:
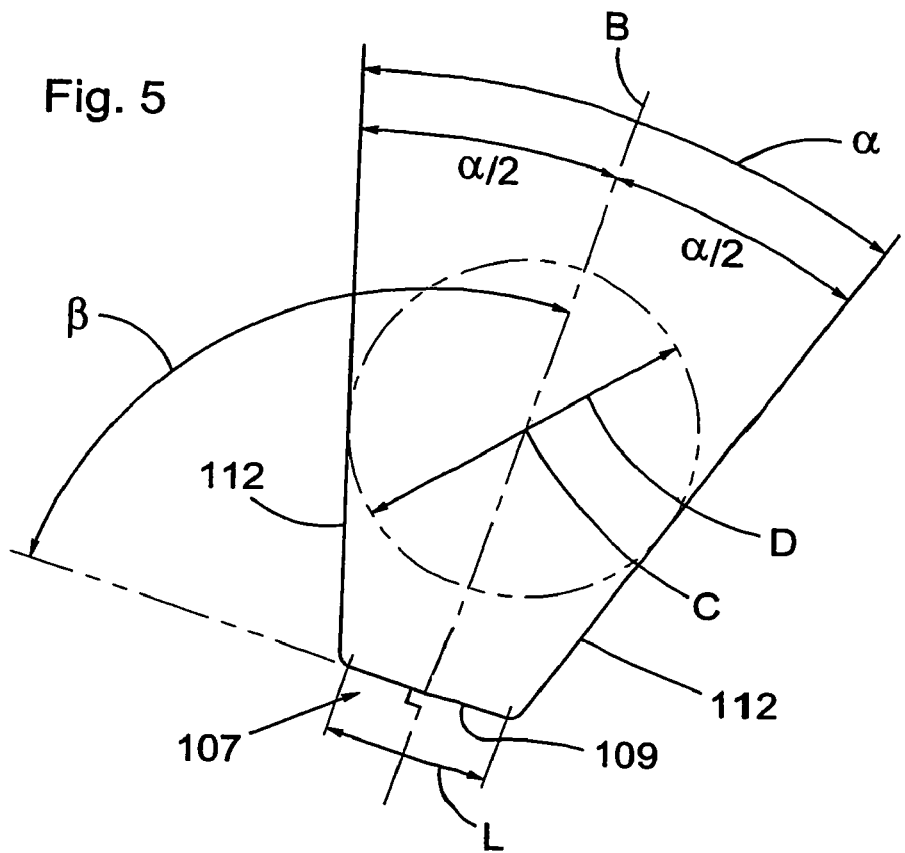
FIG. 5 shows a schematic planar view of a corner of the cutting insert according to FIG. 4.

In FIG. 5, a schematic planar view is shown of a corner area 107 of the cutting insert according to FIG. 4. In this schematic planar view according to FIG. 5, the nose angle a of the corner area 107, i.e. the angle between the edges 112, is by means of a bisector B divided into two equally large angles α/2. In the cutting insert according to FIGS. 4 and 5, α=35°. The bisector B intersects the edge bevel 109 in the centre thereof, i.e. the parts of the edge bevel 109 located on both sides of the bisector B are equally long. The bisector B intersects the edge bevel 109 at a right angle, which in FIG. 5 is defined by the fact that the angle β, between the bisector B and an extension of the edge bevel 109, has a value of 90°. The length of the edge bevel 109 has been designated by L.

In FIG. 5, also the inscribed circle iC is drawn by means of a dashed circular line. In that connection, it should be pointed out that the center C of the inscribed circle iC coincides with the center for the center hole 105 in FIG. 4, and touches all four side edges 112.

By studying FIG. 5, it is realized that the cutting insert for turning according to the present invention shown in FIG. 4 is symmetrical with respect to the bisector B.

Figure 6:
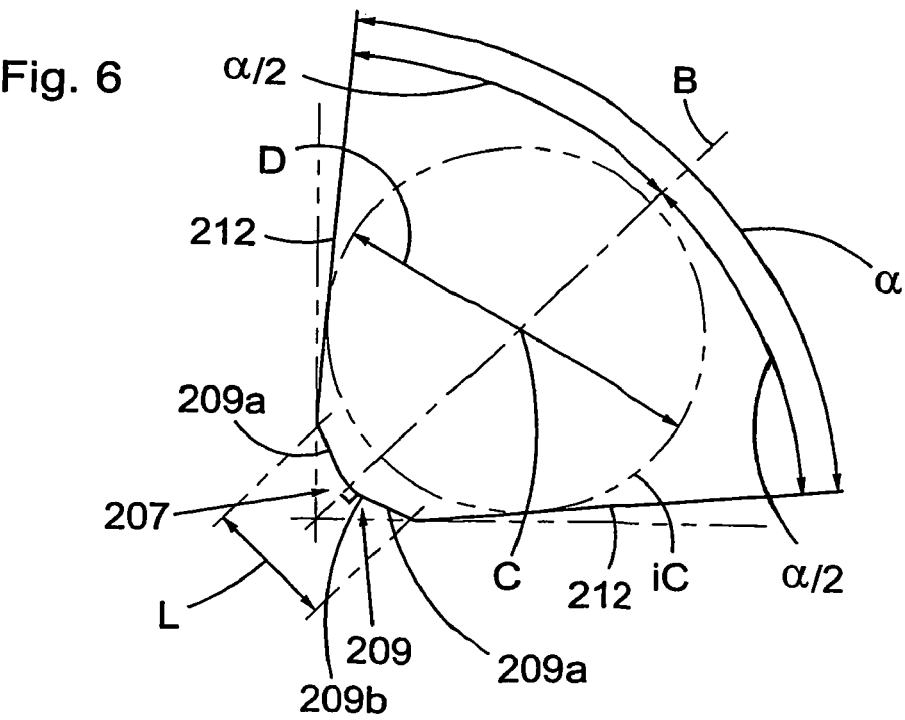
FIG. 6 shows a schematic planar view of a corner of yet an alternative embodiment of a cutting insert according to the present invention.

In FIG. 6, a schematic planar view is shown of a corner area 207 of an additional alternative embodiment of a cutting insert for turning according to the present invention, the cutting insert having a corresponding basic shape as the cutting insert according to FIG. 1. What principally separates the corner area 207 according to FIG. 6 from the corner area 7 according to FIG. 2 is the design of the edge bevel 209, which in FIG. 6 is not rectilinear. More precisely, the edge bevel 209 comprises two rectilinear portions 209a and an arched (curved), intermediate portion 209b which interconnects the rectilinear portions 209a, which portions 209a are not parallel to each other in the planar view shown in FIG. 6. Also in this case, a bisector B of the nose angle α intersects the edge bevel 209 in the center thereof and at a right angle. The length L of the edge bevel 209 is defined as the rectilinear distance between the end points of the non-linear edge bevel 209.

Figure 7:
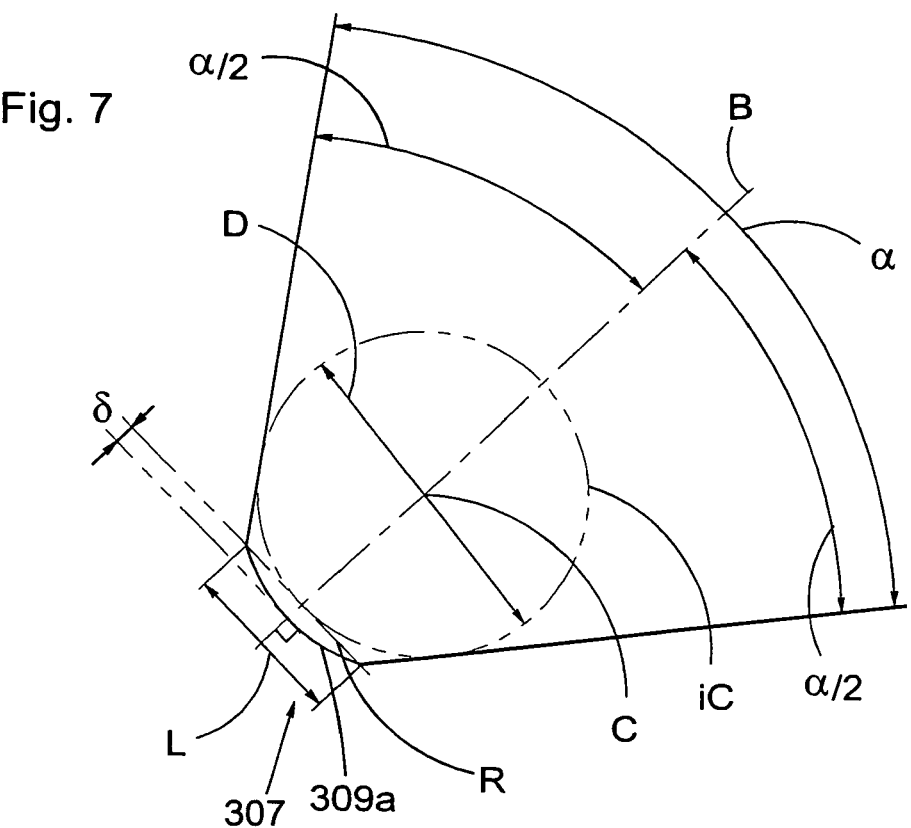
FIG. 7 shows a schematic planar view of a corner of additional alternative embodiments of a cutting insert according to the present invention.
Figure 8:
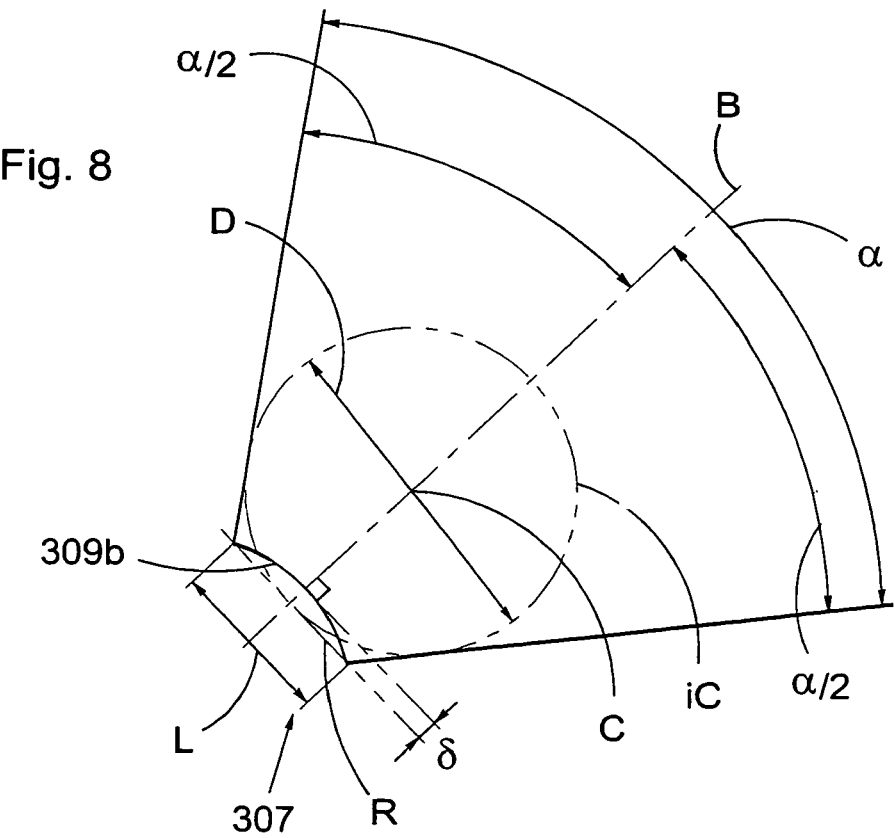
FIG. 8 shows a view similar to FIG. 7 of another alternative embodiment of a cutting insert according to the present invention.

In FIG. 7 and FIG. 8, a schematic planar view is shown of a corner area 307 of additional alternative embodiments of a cutting insert for turning according to the present invention, wherein, within the scope of the present invention, the edge bevel either may be convexly curved 309a (FIG. 7) or concavely curved 309b (FIG. 8). For reasons of clarity, the bending of edge bevels 309a, 309b has been exaggerated. The distance between the reference line RL and the point of the respective edge bevel 309a, 309b located farthest away from the reference line RL has in FIG. 7 and FIG. 8 been designated by δ. Correspondingly as in FIG. 6, the length L of the edge bevel 309a; 309b is defined as the rectilinear distance between the end points of the curved edge bevel 309a or 309b. Within the scope of the present invention, the maximum value for δ/L=0.15. The bisector B intersects the edge bevel 309a, 309b in the center thereof, i.e. the parts of the edge bevel 309a, 309b located on both sides of the bisector B are equally long. The bisector B intersects the edge bevel 309a, 309b at a right angle, which is marked in FIGS. 7 and 8.

The above-described embodiments of cutting inserts for turning are preferably intended for machining high-temperature materials. However, the principles of the present invention may also be applied to cutting inserts for hard turning, in such a case the edge bevel obtaining a relatively seen substantially smaller length.

Generally, in cutting inserts for turning according to the present invention, the following relation between the length L of the edge bevel 9; 109; 209 and the diameter D of the inscribed circle iC applies: $0.01 < L/D < 0.45$. As for cutting inserts intended for machining high-temperature materials the more specified relation $0.1 < L/D < 0.45$ applies. As for cutting inserts for hard turning, the more specified relation $0.01 < LD < 0.1$ applies.

Feasible Modifications of the Invention

The above-described embodiments of cutting inserts for turning according to the present invention have center holes 5; 105 for clamping the respective cutting insert in a holder. However, the cutting inserts according to the present invention may lack centre holes, the same in such a case being clamped by means of, for instance, a clamp. In that event, the imaginary inscribed circle iC of FIGS. 5 and 6 would have its center lying on the bisector B at a location midway between opposite nose areas that are bisected by the bisector B in the embodiments depicted in FIGS. 1-7, and the circle iC. Would touch the cutting edges, i.e., it is inscribed therebetween. In the case of a triangular insert (not shown) the imaginary circle iC would be located so as to touch all three main cutting edges.

In the above-described embodiments of cutting inserts for turning according to the present invention, these have wiper technology as regards the transition between the edge bevel 9; 109 and the connecting edges 12; 112. However, it is also conceivable within the scope of the present invention that the transition between the edge bevel 9; 109 and the connecting edges 12; 112 takes place by means of a constant radius.

The two above-described cutting inserts for turning are generally negative. However, the concept of the present invention is not limited to negative cutting inserts but may also be applied to positive cutting inserts.

The two above-described embodiments of cutting inserts for turning according to the present invention have generally a rhombic shape in planar view. However, within the scope of the present invention, it is also conceivable that the cutting inserts have a generally triangular shape in planar view.

As has been pointed out above, cutting inserts for hard turning may be formed in accordance with the present invention. These cutting inserts need, however, in principle not be provided with any especially formed chip breaker, but the planar surface lying inside the cutting edge constitutes in this case chip breaker.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A turning insert comprising:
   a top cutting surface and a bottom surface, the top cutting surface having at least one corner area, the corner area defining a nose angle in the range of 30-85 degrees;
   first and second side surfaces extending between the top cutting surface and the bottom surface; and
   a clearance surface that is beveled with respect to the first and second side surfaces which are disposed on opposite sides of the clearance surface;
   wherein the intersection of the corner area and the clearance surface defines a beveled edge, a bisector of the nose angle intersecting the beveled edge at a midpoint thereof at a right angle.

2. The turning insert according to claim 1 wherein the cutting corner includes a chip breaker disposed inwardly of the beveled edge.

3. The cutting insert according to claim 2 wherein the nose angle is defined by two side edges disposed on opposite sides of the corner area, the insert further including a center through-hole adapted to receive a fastener screw, the beveled edge defining a length L; an imaginary circle touching the two side edges and being concentric with the through-hole, the imaginary circle defining a diameter D, wherein the ratio L/D lies in the range 0.01 to 0.45.

4. The cutting insert according to claim 3 wherein the beveled edge is rectilinear.

5. The turning insert according to claim 3 wherein at least part of the beveled edge is curved.

6. A turning insert comprising:
   a top cutting surface and a bottom surface, the top cutting surface having at least one corner area, the corner area defining a nose angle in the range of 30-85 degrees;
   first and second side surfaces extending between the top cutting surface and the bottom surface; and
   a clearance surface that is beveled with respect to the first and second side surfaces which are disposed on opposite sides of the clearance surface, wherein:
   the intersection of the corner area and the clearance surface defines a beveled edge, a bisector of the nose angle intersecting the beveled edge at a midpoint thereof at a right angle,
   the cutting corner includes a chip breaker disposed inwardly of the beveled edge,
   the nose angle is defined by two side edges disposed on opposite sides of the corner area, the insert further including a center through-hole adapted to receive a fastener screw, the beveled edge defining a length L; an imaginary circle touching the two side edges and being concentric with the through-hole, the imaginary circle defining a diameter D, wherein the ratio L/D lies in the range 0.01 to 0.45, and
   wherein both sides of the beveled edge are connected to respective main cutting edges by at least one circular wiper edge.

7. The turning insert according to claim 3 wherein the bottom surface is a cutting surface, and the top cutting surface and the bottom surface are intersected by at least three side surfaces that are oriented perpendicular to the cutting surfaces.

8. The turning insert according to claim 3 wherein the side edges constitute main cutting edges.

9. The turning insert according to claim 2 wherein the at least one corner area comprises first and second corner areas disposed opposite one another and both being bisected by the bisector, disposed on opposite sides of the respective corner area, the beveled edge of each corner area defining a length L; an imaginary circle touching all four side edges of the first and second pairs defining a center lying on the bisector midway between the first and second nose areas, the imaginary circle defining a diameter D, wherein the ratio L/D lies in the range 0.01 to 0.45.

10. The turning insert according to claim 9 wherein the beveled edge is rectilinear.

11. The turning insert according to claim 9 wherein at least part of the beveled edge is curved.

12. A turning insert comprising:

a top cutting surface and a bottom surface, the top cutting surface having at least one corner area, the corner area defining a nose angle in the range of 30-85 degrees;

first and second side surfaces extending between the top cutting surface and the bottom surface; and a clearance surface that is beveled with respect to the first and second side surfaces which are disposed on opposite sides of the clearance surface;

wherein the intersection of the corner area and the clearance surface defines a beveled edge, a bisector of the nose angle intersecting the beveled edge at a midpoint thereof at a right angle, wherein both sides of the beveled edge are connected to respective main cutting edges by at least one circular wiper edge.

13. The turning insert according to claim 1 wherein the bottom surface is a cutting surface, and the top cutting surface and the bottom surface are intersected by at least three side surfaces that are oriented perpendicular to the cutting surfaces.

* * * * *